Nov. 9, 1971          L. ANCE          3,618,275
COLLAPSIBLE HOUSING FOR ELECTRICAL GOODS
Filed Nov. 12, 1969                    5 Sheets-Sheet 1

LOUIS ANCE
*INVENTOR.*

BY *Roy B. Moffitt*
ATTORNEY

Nov. 9, 1971  L. ANCE  3,618,275
COLLAPSIBLE HOUSING FOR ELECTRICAL GOODS
Filed Nov. 12, 1969  5 Sheets-Sheet 2

SECTION A-A
22 SIGNAL TRANSMITTER
RADIOACTIVE OR
MAGNETIC MEANS

22 SIGNAL TRANSMITTER
RADIOACTIVE OR
MAGNETIC MEANS

LOUIS ANCE
*INVENTOR.*

BY *Ray B. Morris*

ATTORNEY

LOUIS ANCE
*INVENTOR.*

BY
ATTORNEY

United States Patent Office 3,618,275
Patented Nov. 9, 1971

3,618,275
COLLAPSIBLE HOUSING FOR ELECTRICAL GOODS
Louis Ance, Hickory, N.C., assignor to Superior Continental Corporation, Hickory, N.C.
Filed Nov. 12, 1969, Ser. No. 875,985
Int. Cl. B65d 7/12, 7/28, 7/46
U.S. Cl. 52—169
16 Claims

ABSTRACT OF THE DISCLOSURE

Disclosed herein is a housing, which is essentially a box adapted for containing electrical apparatus while both box and the apparatus are buried in the ground during service. The instant housing is a weather-resisting container adapted for ready assembly and disassembly by a sole workman, this knockdown feature being advantageous in that it facilitates shipment of the housing from place to place with a minimum of occupied volume. Making up the housing are two rectilinear pieces of plastic material, each having a series of slots aligned along one terminal portion thereof and a corresponding series of upstanding aligned T-shaped protuberances disposed along an opposite terminal portion, the longitudinal dimension of the uppermost portion of the T-shaped protuberances being larger than the largest dimension of the slots. Each of the pieces of plastic have a transverse groove running parallel to those terminal portions possessing the slots and T-shaped protuberances. Both of the plastic pieces are configured into a right-angle shape by bending along the transverse groove and juxtapositioned one to another wherein the T-shaped protuberances of one such piece are aligned with the slots of a second plastic piece, the sidewalls of the slots mechanically engaged in the perpendicular shank portions of the T-shaped protuberances. Additionally, there are disposed on both surfaces opposite from the first-mentioned aligned T-shaped protuberances additional T-shaped protuberances disposed at predetermined locations between those terminal portions possessing the slots and first-mentioned T-shaped protuberances. These act in concert with a plurality of U-shaped spacer bars possessing elongated apertures at terminal portions thereof by being removably engaged with the last-mentioned T-shaped protuberances. In service, a weather-proof splice case, having therein at least two insulated electrical conductors in electrical and mechanical connection, is placed on the spacer bars with the insulated electrical conductors being let out through an opening in the bottom of one of the sidewalls of the housing.

BACKGROUND OF THE INVENTION

In the past, most telephone transmission lines were installed above ground and splices of electrical conductors were housed in containers called "pedestals." However, there is now a strong trend to place such transmission lines beneath grade, i.e., underground, and do away with the unsightly above-ground pedestals. At first blush, such a trend would appear to present few, if any, problems. Unfortunately, this has not been the case as far as the telecommunications field is concerned. Aside from the multitude of problems such as corrosive attack by electrolysis, attack by rodents and the ever-present water and water vapor problem, there is the additional problem encountered in underground electrical installations of where, how, and what apparatus can be used to house splice cases and other like containers that are used to enclose two or more telephone transmission lines spliced one to another. Thus, there has been developed a long-felt need for some kind of apparatus that is economical, easily transported, and structurally suitable for housing transmissin line splice cases underground.

As a general rule, electrical and mechanical splices joining one transmission line to another, for one purpose or another, are themselves housed in a water-proof plastic case called a "splice case." In turn, the splice case must be placed in, but not necessarily on, the ground and housed in a manner that the case is easily accessible from the surface and protected as much as possible from those corrosive elements found in the ground. In short, the housing of the instant invention is an underground pedestal. To this end, the instant invention is directed.

SUMMARY OF THE INVENTION

The housing of the instant invention is made up basically of two pieces of plastic. These pieces of plastic are rectilinear in shape and have T-shaped protuberances aligned along one terminal portion and a plurality of slots, having a dimension adapted to be slidably engageable to the shank portion of a like T-shaped protuberance, aligned along an opposite terminal portion. At a predetermined place between these two terminal portions, the piece of plastic is appropriately scored so as to allow it to be bent into a right-angle configuration along the score line.

Two such pieces of plastic, as described above, are juxtapositioned one in relationship to the other so that the T-shaped protuberances of one such piece of plastic are slidably engaged in the slots of the other piece of plastic. The same mechanical arrangement is made at the opposite end. Inasmuch as the assembled housing is made up of two pieces of plastic, which are adapted to be flat lying, it can be readily seen that the collapsible nature of the housing itself is a desirable feature, especially from the standpoint of transporting component piece parts from one place to another.

T-shaped protuberances are disposed at predetermined locations on an opposite surface and between the two terminal portions, which contain the first-mentioned T-shaped protuberances and slots. To give rigidity and structural strength to the entire assembled structure, U-shaped spacer bars, with an aperture in the terminal portions thereof, are engaged underneath the head portion and onto a shank part of the last-mentioned T-shaped protuberances. Obviously, these last-mentioned T-shaped protuberances are positioned in a mirror-like relationship one to another on opposing sidewalls. The thus-assembled housing is then ready to be placed into the ground along with attending electrical apparatus and will maintain an opening in the ground indefinitely for whatever purpose it is needed.

DETAILED DESCRIPTION OF THE INVENTION

Figure 7:
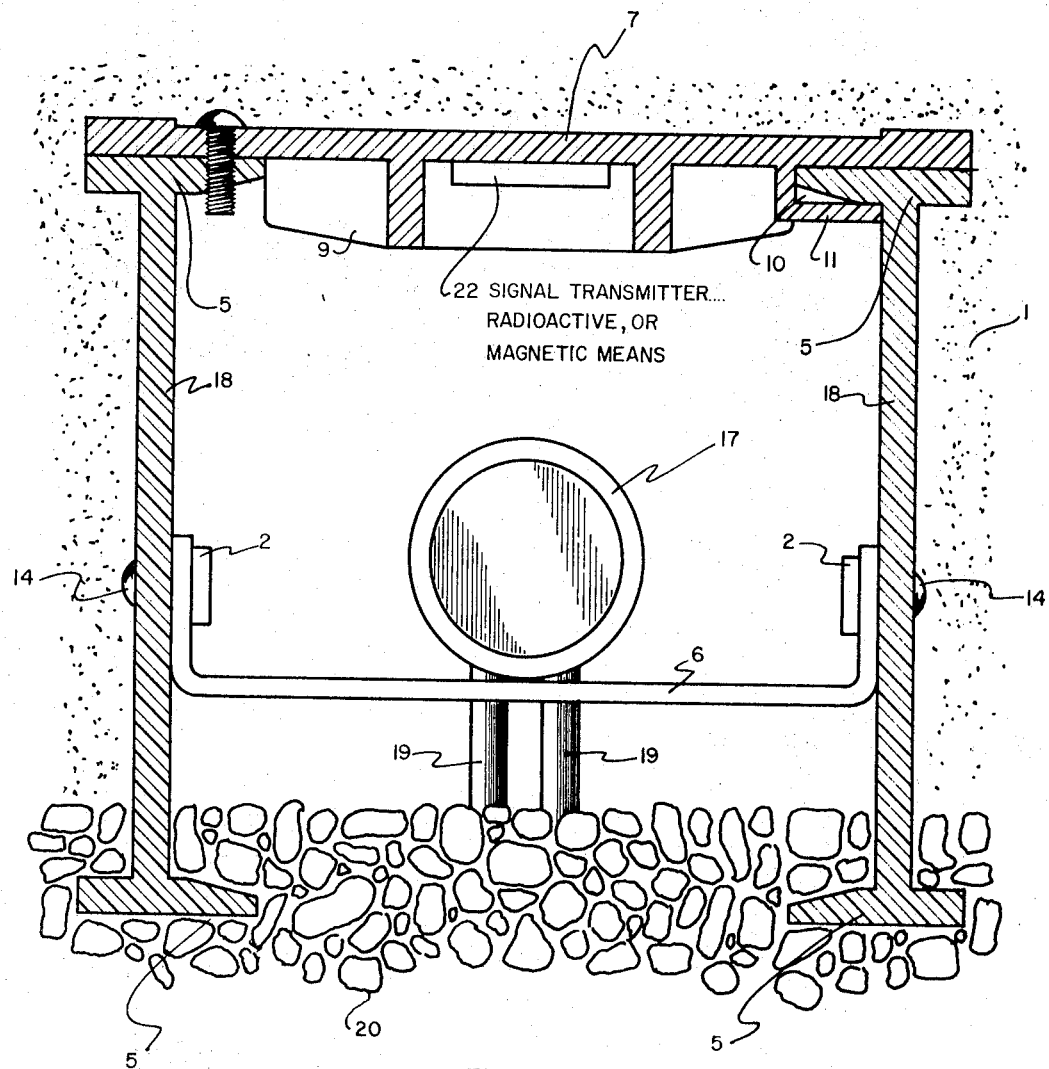
FIGS. 7 and 8 show in cross section the housing illustrated in FIG. 1 indicating how the housing would be used in service; spacer bars are herein shown adding rigidity to the housing assembly and supporting a splice case assembly; and, FIG. 9 shows a configurated piece of plastic with T-shaped protuberances and slots on opposite terminal portions. Also illustrated, in phantom, are housing end and sidewalls and how these walls are created by bending the piece of plastic along a score line.
Figure 8:
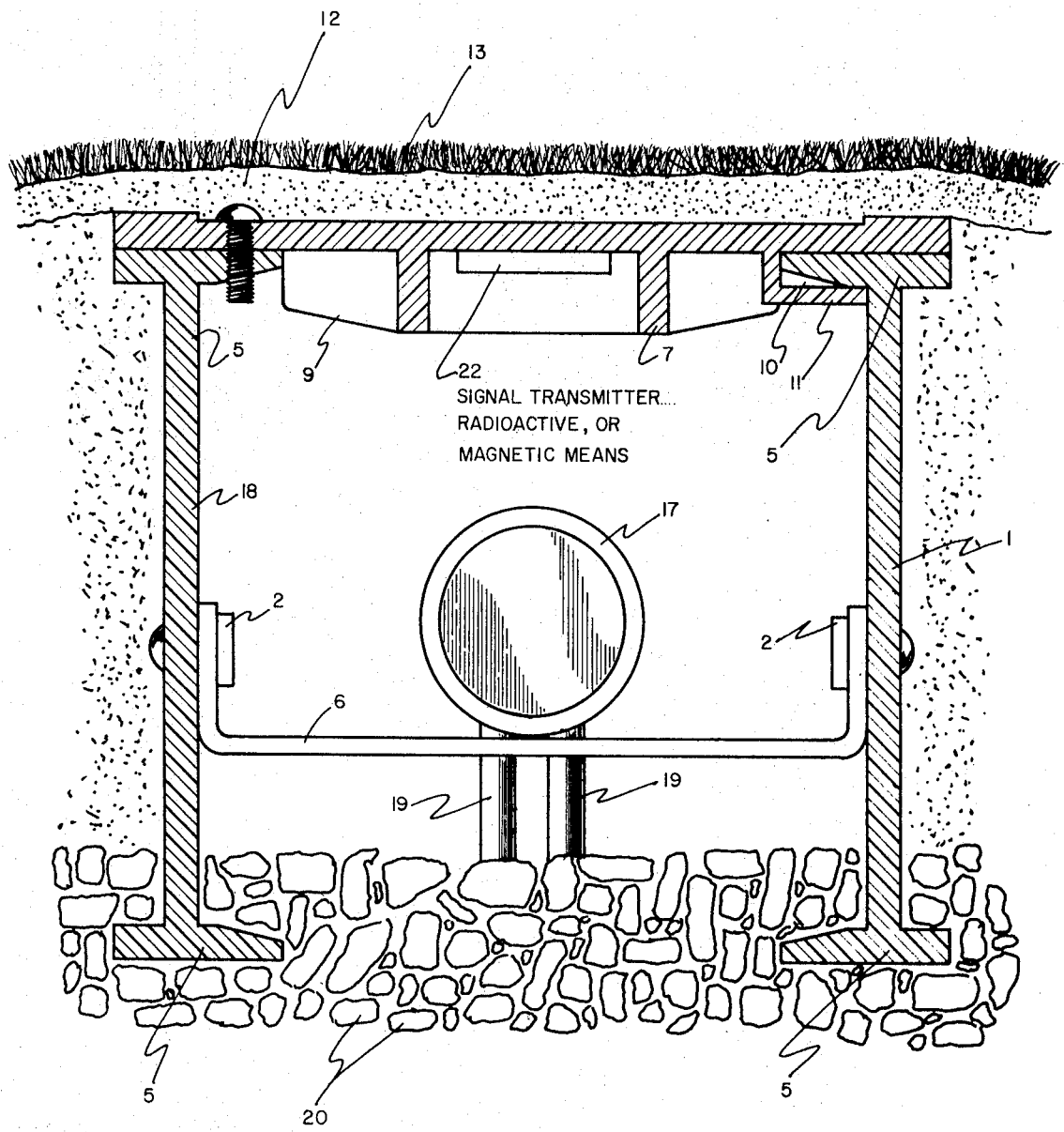

Housing for electrical goods as described by the instant disclosure are commonly adapted to lie just beneath the soil or flush with the soil surface. Primarily, the disclosed housing is a construction that is used to maintain an opening in the ground. The housing indicated generally at 1 in FIGS. 7 and 8 are shown housing a splice case 17 lying on and supported by spacer bars 6. The housing 1 is basically constructed of three components, i.e., two rectilinear pieces of plastic such as element 18 shown in FIG. 9 and a top piece or lid, shown generally by element 7 in FIG. 1. These elements, in assembled combination, result in a configuration like unto an open-top box.

Figure 5:
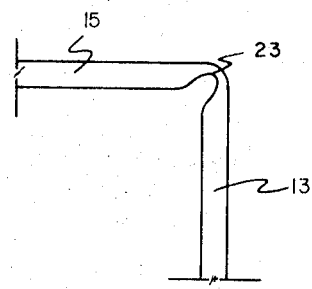
FIG. 5 is a partial view of one component of the housing assembly showing how that component is scored along the transverse line and folded into a right angle along such a score.
Figure 9:
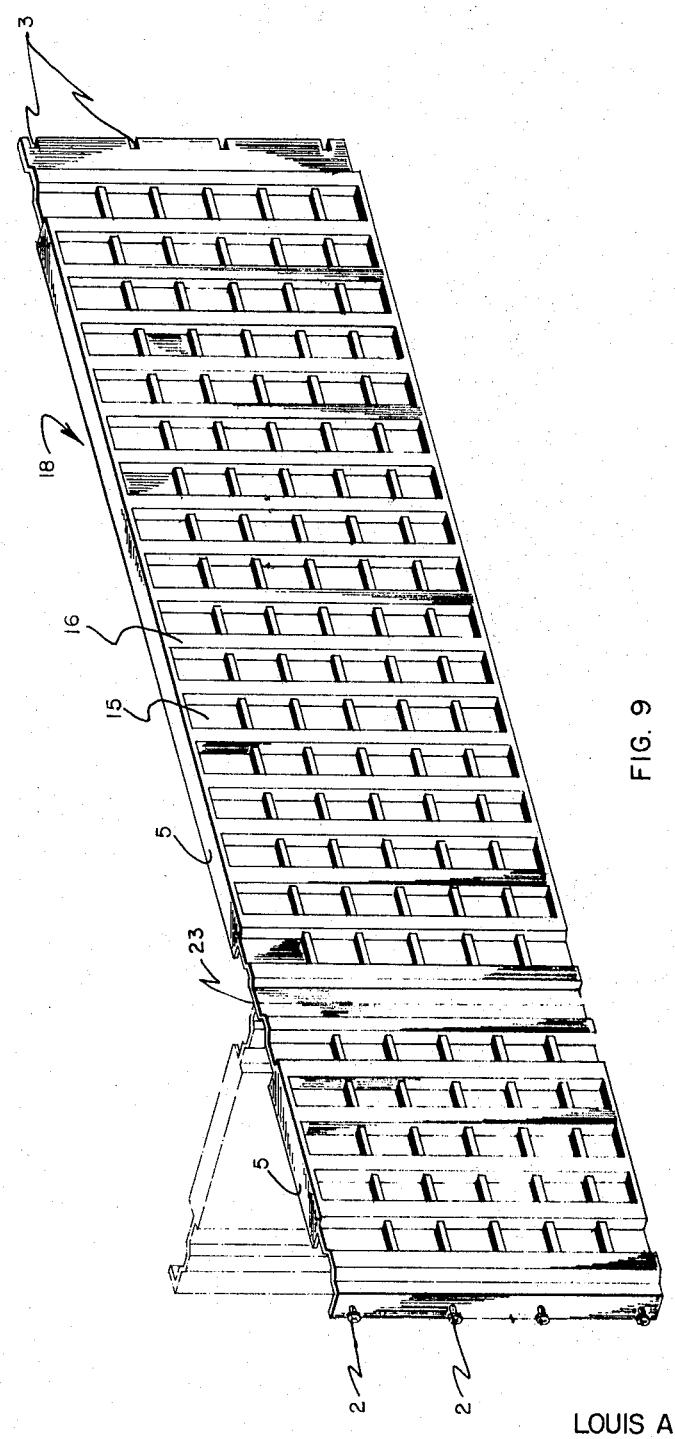

Two pieces of plastic material configured like that shown as element 18 in FIG. 9 make up the basic components of the instant housing structure. Element 18 is a configurated piece of plastic, which is rectilinear in shape, one terminal portion having aligned slots 3 therealong and an opposite terminal portion having aligned T-shaped protuberances 2, in an alignment complementary to the slots 3. At a predetermined position 23 between the just-mentioned protuberances and slots, the piece of plastic 18 is scored along a line parallel to the slots 3 and protuberances 2. This scoring is shown by element 23 in FIG. 9 and more in detail by the same element in FIG. 5. Such a scoring allows the piece of plastic 18 to be bent along the score line 23 as shown in phantom in FIG. 9 to form one end wall and one sidewall. It will be noted that plastic piece part 18 is further configurated in such a manner to have upstanding transverse and longitudinal ribs 16 that create predetermined spaced-apart cavities 15. Furthermore, those terminal portions of the plastic piece 18, not otherwise possessing aligned slots 3 or T-shaped protuberances 2, are configurated into an integral T-shape-like flat member 5, upon which the sidewall itself can rest when in service. Also, a lid member 7 can be disposed on this flat surface.

Two such plastic pieceparts, as shown by element 18 in FIG. 9 and thus configurated, make up the basic component parts of the instant housing. These pieces are bent along the score line 23 so as to achieve, as shown in phantom in FIG. 9, one sidewall and one end wall. The T-shaped protuberances 2 of one such plastic piece 18 are slidably engaged in slots 3 of another such plastic piece 18 and vice versa. Such an arrangement will essentially result in that assembled housing as shown by element 1 in FIG. 1. Element 1 of FIG. 1 also shows an end wall having an arched passageway 4 disposed therein. This arched passageway is used to allow cable members 19 to pass from outside of the housing to the inside thereof.

Figure 1:
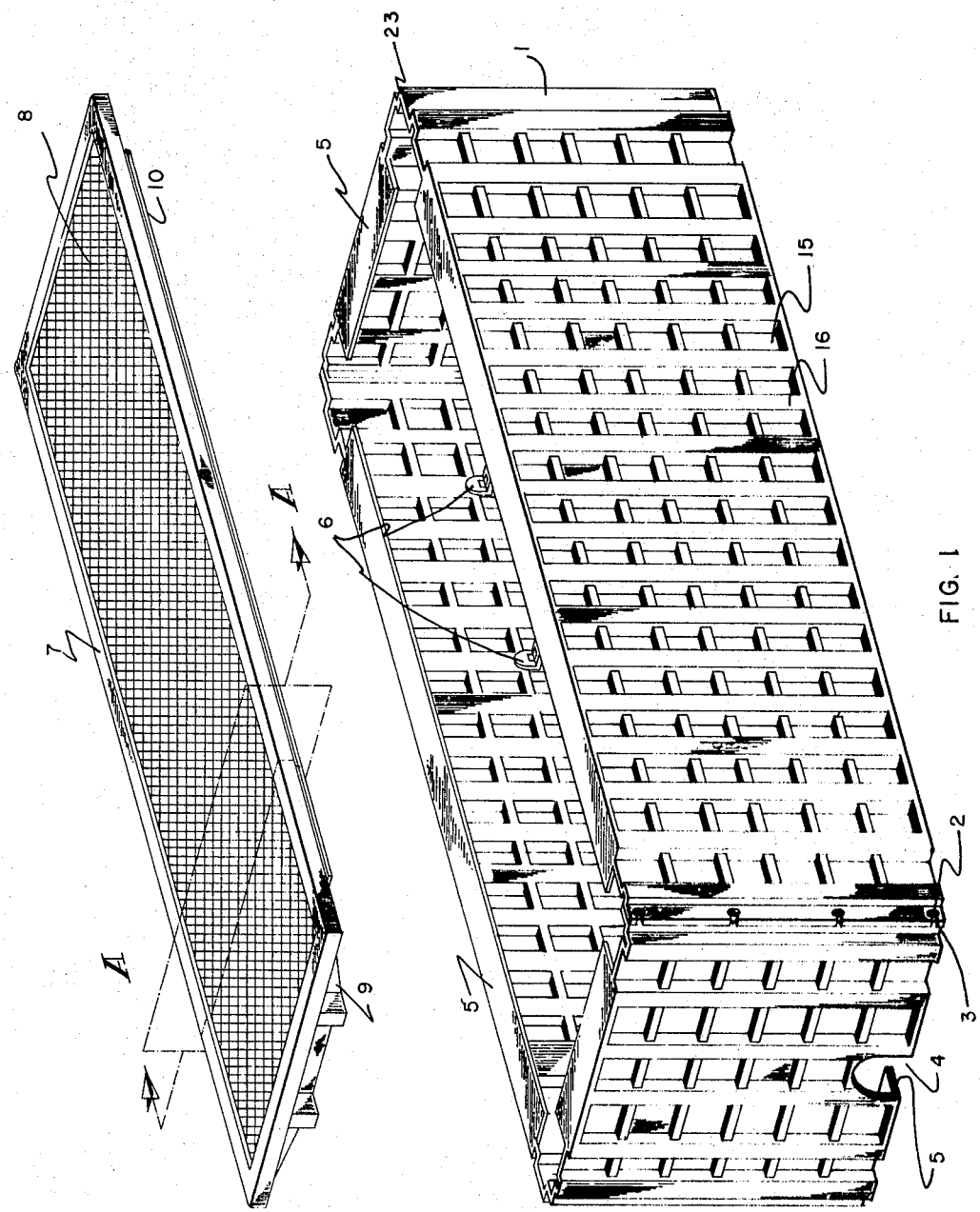
FIG. 1 is a pictorial view of the instant housing in assembled relationship and also showing an appropriate lid.
Figure 4:
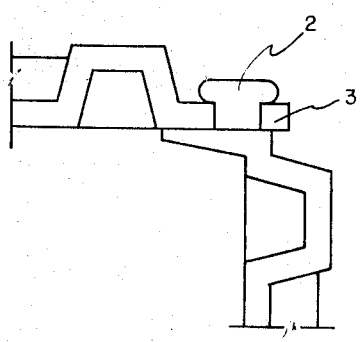
FIG. 4 is a partial view of the housing component pieces showing how one terminal portion of a plastic piece interlocks with the another.

Shown in FIG. 1 are U-shaped spacer bars 6 that add rigidity to the assembled housing. Turning attention briefly to FIGS. 7 and 8, one can immediately grasp the essential nature of spacer bars 6. These bars, which can be either molded of metal or plastic, are U-shaped in nature with apertures at the terminal ends adapted to be slidably engageable around a shank portion 3 of the T-shaped protuberances. Inasmuch as these T-shaped protuberances are disposed on the sidewall 18 in mirror-like relationship one to another, the engagement of the U-shaped spacer bar adds rigidity and permanence to the upstanding sidewall 18 upon engagement thereof. This spacer bar also serves a dual function, as it provides a platform upon which splice case 17 can be disposed, thereby keeping the splice case from actually coming into contact with soil or surrounding rock particles. In this connection, the housing itself has no bottom.

The transverse and longitudinal ribs 16 creating spaced-apart cavities 15 in the side and end walls of the housing have a definite function in that they provide discrete void spaces wherein soil and rock particles can become mechanically engaged and interlocked. This interlocking feature, coming into play when the housing is put into service, prohibits freezing and thawing action from expelling the housing per se from its in-service position as buried in the ground. In other words, the housing is mechanically locked to the surrounding ground and will not be expelled from the ground as would be expected after being exposed to prolonged service conditions.

The particular nature of the apertures in U-shaped spacer bars 6 are more fully described in U.S. Pat. 3,476,-867 (174—037) to Jules A. Mack, and assigned to a common assignee. The contents of the aforementioned patent as it relates to spacer bars, spacer bar structure, and T-shaped protuberances adapted to engage such spacer bars is herein incorporated by reference and made an integral part of the instant disclosure.

Figure 2:
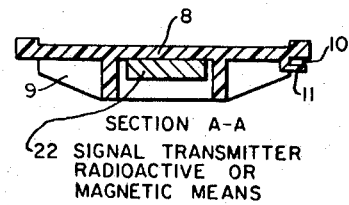
FIG. 2 is a cross section of one species of a lid showing transverse rib members, locating, and lip means for anchoring the lid to a main body.
Figure 6:
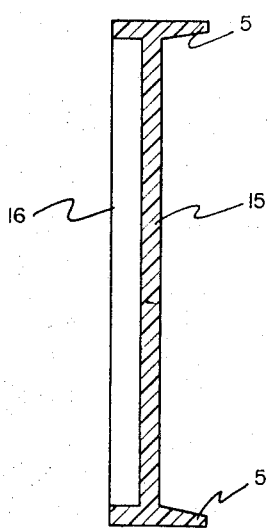
FIG. 6 is a cross-sectional view of that housing component making up the housing sidewall.
Figure 3:
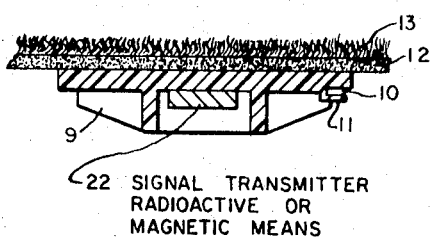
FIG. 3 is a species of lid as shown in Fig 2, having artificial turf fixedly attached to the uppermost surface of the lid.

Shown in FIG. 1 is a lid or top 7 adapted to close one end of that open construction shown generally as element 1 in FIG. 1. It will be appreciated that lid 7, on its uppermost surface, is configurated to the extent that spaced-apart cavities are formed as indicated by portion 8 of lid 7. These cavities serve the same function as cavities 15. FIGS. 2 and 3 show a cross section of lid 7 and depict more clearly rib 9, which runs transverse to a long axis of lid 7. This rib acts as a rigidifying means to add structural strength to the lid overall. Running along one terminal portion of lid 7 on its underside, is an integrally-molded lip 11 creating a cavity 10. This lip and cavity is shown in FIGS. 2 and 3. FIGS. 7 and 8 also show lip 11 creating cavity 10 in which member 5 is disposed, thereby engaging the lid 7 to the sidewall 18 of the housing. That terminal portion of the lid opposite from where lip 11 and cavity 10 are disposed, is envisioned to be anchored to its sidewall member 18 via element 5 by means of screw 20 as shown in FIGS. 7 and 8.

Lid 7, on its underside, at any convenient place normally has a detecting means as shown by element 22 in FIGS. 2, 3, 7, and 8. Element 22 can either be a signal transmitter, (such as a radio transmitter), radioactive, or a magnetic means. Basically, element 22 is some sort of low level energy emission device that would permit easy location, by some appropriate mechanism, of the housing 1 by interested parties. One of the nemesis of burying anything underground is the always recurring problem of being able to find that which one has previously buried, without a great deal of expenditure of time, money and effort. Therefore, element 22 is attached to the underside in any convenient place and acts in conjunction with a detector means in the hands of those wishing to find the housing location.

Shown in FIG. 7 is a housing in service, employing a lid such as that shown in FIG. 2. Such a lid and in-service posture indicates that the uppermost reaches of the housing itself (the lide surface) is below ground level. On the other hand, it is envisioned that in-service housings will be postured so that their uppermost reaches will be flush with the surface of the earth. In view of the fact that underground installation of electrical and telecommunication apparatus is primarily bottom on the aesthetic requirements of the customer and furthermore in view of the fact that such a customer would object to having a bare spot in an otherwise well-kept lawn, it is envisioned that artificial turf, made up of a substrate 12 with artificial grass 13 firmly affixed thereto, be permanently attached to lid 7. Thus, when a hole is created in a subscriber's yard, in which the housing is to be placed, by merely securing the lid to the housing itself with the artificial turf attached to the upper surface thereof, the scar would not be recognizable. It would only be required that the top of the housing be essentially flush with the surface of the ground.

Lid 7 and plastic piece 18 can be made of almost any moldable plastic material. Naturally, the plastic material selected should be flexible and adapted to be scored so as to allow a right-angle bend along the score line. Most any plastic available to the plastic artisan can be used such as polyethylene, polypropylene, polyvinyl chloride, and polycarbonate. In order to avoid excessive attacks from rodents, such as gophers and the like, it is envisioned that plastic pieces 18, as well as lid 7, can be either coated with, or combined with a rodent repellant material such as defined and described in U.S. Pats. 3,389,048; 3,135,657; and 3,132,992. The teachings of these United States Patents are herein incorporated into the instant disclosure by express reference.

One of the great advantages of the disclosed housing is its knockdown characteristic. Such a characteristic permits a minimum of occupied volume during shipment and transport. When this feature is coupled with the ease one man is able to assemble the instant housinig at the job site, the advantages of this novel structure is significant. This significance is emphasized further when it is realized that the all-plastic or plastic plus metallic spacer bar construction is extremely light weight and easy to transport in the field under service and installation conditions. However, notwithstanding the light weight characteristic of the housing, there is no sacrificing of structural strength as evidenced by subjecting the installed housing to the dynamic and static test of a loaded tractor-trailer commercial truck with no damage to the housing. Another added feature—employed mainly when the housing is placed in service beneath grade—is the magnetic, radioactive, or signaling means attached to the housing lid. Such is used so as to facilitate the relocation of the housing when buried below grade, by either a Magnetometer, Geiger, Sintillator, or signal (radio) receiver.

With the scope ok knockdown characteristic or easy assembly nature, reference is made to T-shaped proturberance 2. This proturberance, which inherently has a shank member, also has a flat head portion integral with the shank. Such protuberances are either integrally molded with sidewall 18, or, in the alternative, holes are drilled into the sidewall 18 of a diameter and size so as to easily receive the shank portion of the T-shaped protuberances. Since the shank member is integral with the flat heads, such as that shown at 2 and 14 in FIGS. 8 and 7 respectively, the flat head portion can be automatically spaced apart from the intermost surface of sidewall 18 by a simple location of the shank member within the sidewall 18. There is a threaded hole in the shank member of the protuberance and this threaded hole is adapted to receive a flat-headed bolt 14, thereby engaging the shank member of protuberance 2, and spacing apart from sidewall 18 that T-shaped portion of protuberance 2 in a desired position.

Pea-size gravel 20 as shown generally in FIGS. 7 and 8 is preferred to surround the bottom-most portion of sidewall 18 and feet 5; however, such is not necessarily obligatory. It has been found, however, that this particular size gravel is more effective against rodents (especially gophers) because this size gravel appears to discourage such rodents from burrowing into the inside of the housing. It might, at this point, be questioned or postulated as to why there is no bottom made and attached in a manner like that of top 7. Just such a construction has been investigated and it has been correspondingly found that a completely enclosed housing acts like and is a buoyant object when placed underground. Such a bouyant object behaves much like a buried fuel oil tank in that it has a propensity to "float" itself right out of the ground when wet weather is encountered or alternating freezing and thawing is predominant. Consequently, an open-bottomed housing is preferred for the foregoing reasons.

I claim:

1. An article of manufacture comprising a one-piece quadrangular plastic member defining a plurality of side walls of a housing or the like and having a pair of spaced apart terminal portions, each of said terminal portions terminating at an outer side edge of said member and having oppositely facing side surfaces that terminate at said side edge, a plurality of protuberance-receiving slots formed in and aligned along one of said terminal portions, said slots extending to and opening at said side edge at which said one terminal portion terminates, a corresponding plurality of protuberances aligned along and rigid with the other of said terminal portions, each of said protuberances having a stem portion terminating in a larger head portion, with said stem portion extending laterally from one of said side surfaces, each of the head portions of said protuberances having a dimension extending transversely of said slots that is larger than the largest width of said slots, and said member being further formed with a groove extending between and essentially parallel to said terminal portions and being sufficiently deep to enable said member to be bent therealong to thereby provide a corner juncture between said side walls, said protuberance stem portions and slots being adapted to be respectively received in and receive corresponding slots and protuberance stem portions on a complementary, side wall-defining structure to thereby provide corner connections with said structure.

2. The article of manufacture as described in claim 1 wherein that region of said member extending between said terminal portions has spaced-apart transverse and longitudinal rib members, said ribs defining discrete cavities in said member that are adapted to mechanically engage with surrounding soil particles when assembled with said complementary structure and placed in the earth.

3. The article of manufacture as described in claim 1 wherein there is integrally molded to a terminal portion of said plastic member, other than where said protuberances and slots are disposed, a piece of plastic perpendicular to the surface of said first-mentioned rectilinear plastic.

4. The article of manufacture as described in claim 1 wherein there is disposed on that surface opposite from said first-mentioned aligned protuberances, additional protuberances of like configuration, said additional protuberances being disposed a predetermined location between said terminal portions.

5. The article of manufacture as described in claim 4 wherein that region of said member extending between said terminal portions is formed with spaced apart transverse and longitudinal ribs said ribs defining discrete cavities in said plastic member that are adapted to mechanically engage with surrounding soil particles when said member is assembled with said complementary structure and placed in the ground.

6. The article of manufacture as described in claim 4 wherein there is integrally molded on one of said terminal portions, other than where said first-mentioned protuberances or slots are disposed, a piece of plastic perpendicular to the surface of said member.

7. A multi-sided structure having side walls and adapted to maintain an opening in the earth, said structure comprising at least two quadrangular separately formed plastic members each defining a plurality of said side walls, each of said members having a pair of spaced apart terminal portions, each of said terminal portions terminating at an outer side edge of its plastic member and having oppositely facing side surfaces that terminate at said side edge, a plurality of slots formed in and aligned along one of said terminal portions of each member, and a corresponding plurality of protuberances formed integral with and aligned along the other of said terminal portions of each member, said slots extending to and opening at said side edge at which said one terminal portion terminates, and each of said protuberances having a stem portion extending laterally from one of said side surfaces of said other terminal portion and terminating in a larger head portion, each of the head portions of said protuberances having a dimension extending transversely of said slots that is larger than the largest width of said slots, each of said member being further formed with a groove extending between and esesntially parallel to said terminal portions and being sufficiently deep to enable each member to be bent therealong to thereby provide a corner juncture between the side walls defined by each member, the protuberance stem portions of one of said members being receivable in the slots in the other of said members to provide an interlocking corner connection between the two members, and the protuberance stem portions of said other of said members being receivable in the slots of said one member to provide another interlocking corner connection between the two members.

8. The multi-sided structure as defined in claim 7, wherein:
(a) there are on those surfaces, opposite from said first-mentioned aligned protuberances, additional like protuberances disposed at predetermined locations between those terminal portions possessing said slots and first-mentioned protuberances; and,
(b) a plurality of U-shaped spacer bars having elongated apertures at terminal portions thereof being removably engaged with said second-mentioned protuberances.

9. The multi-sided structure defined in claim 7, wherein there is integrally molded to one terminal portion of both of said plastic members, other than where said protuberances and slots are disposed, a plastic lip perpendicular to the surface of one of said members.

10. The multi-sided structure adapted defined in claim 9, including a plastic rectilinear top, said top having integrally molded thereon at one terminal edge an L-shaped groove forming member, said groove to be in mechanical engagement with said plastic lip.

11. A housing side wall construction for maintaining an opening in the earth comprising at least a pair of separately formed, one-piece panels each defining at least two housing side walls and having a corner juncture between and integrally joining said side walls, each of said panels terminating at opposite ends thereof in first and second flanges, said flanges respectively extending from the ends of said side walls remote from said corner junction, with said first flange extending laterally from its adjacent side wall and essentially parallel said second flange, said first flange of one of said panels being in overlapping relation with said second flange of the other of said panels, and said second flange of said one of said panels being in overlapping relation with said first flange of said other of said panels, each of said flanges terminating at an outer edge of its associated panel and having oppositely facing side surfaces terminating at said outer edge, one of said flanges of each of said panels being formed with a plurality of spaced apart slots that extend to and open at said side edge as said one flange terminates, and each of the other of said flanges of each of said panels having a corresponding plurality of protuberances arranged in a row, each of said protuberances having a stem portion extending laterally from one of said surfaces and terminating in an enlarged head, the protuberance stem portions on said one of said panels being received in said slots in said other of said panels to dispose said protuberance head portions on said one of said panels in overlapping relation with the adjacent side surface of said one flange of said other of said panels for providing one corner connection between said panels, and the protuberance stem portions on said other of said panels being received in said slots in said one of said panels to dispose said protuberance head portions on said other of said panels in overlapping relation with the adjacent side surface of said one of said flanges on said one of said panels for providing another corner connection between said panels.

12. The housing side wall construction defined in claim 11 wherein said first flange of each of said panels extends inwardly into the space that is delimited by said panels.

13. The housing side wall construction defined in claim 11 wherein each of said panels is formed from plastic material and has a groove extending along said corner juncture and being sufficiently deep to enable each panel to be bent therealong for defining said corner juncture and for so positioning the side walls of each panel that the included angle between the side walls of each panel is less than 180°.

14. The housing defined in claim 13 wherein said protuberances on each panel are integral with their associated panel.

15. The housing defined in claim 14 wherein the outwardly facing surface of each of said side walls of each panel is formed with a series of spaced apart longitudinal ribs and a series of spaced apart transverse ribs transversely intersecting said longitudinal rib to co-act with said longitudinal ribs to define a series of outwardly opening pockets that are adapted to receive and interlock with particles of the earth to prevent the assembly of said panels from being expelled from the earth by freezing or thawing conditions.

16. A housing sidewall construction comprising a one-piece plastic panel defining at least two adjacent housing side walls and a corner juncture between and integrally joining said side walls together, said panel terminating at opposite ends thereof respectively in first and second flanges, said flanges respectively extending from the ends of said side walls remote from said corner juncture, with said first flange extending laterally from its adjacent side wall and essentially parallel with said second flange, each of said flanges terminating at an outer side edge of said panel and having oppositely facing side surfaces terminating at said outer edge, one of said flanges being formed with a plurality of spaced apart slots that are arranged in a row and extend to and open at the side edge at which said one flange terminates, the other of said flanges having a corresponding plurality of protuberances arranged in a row adjacent to the side edge at which said other flange terminates, each of said protuberances having a stem portion extending laterally from one of said side surfaces of said other flange and terminating in an enlarged head, and said panel being formed with a groove extending along said corner juncture and being sufficiently deep to enable said panel to be bent therealong for defining said corner juncture and angulating one of said side walls relative to the other of said side walls, said protuberance stem portions and said slots being adapted to respectively be received in and receive corresponding slots and protuberance stem portions on a complementary side wall-defining panel member to thereby provide corner connections with said complementary member.

References Cited
UNITED STATES PATENTS

| | | | |
|---|---|---|---|
| 903,555 | 11/1908 | Ferres | 229—41 A |
| 2,760,895 | 8/1956 | Holgerson | 94—7 |

(Other references on following page)

UNITED STATES PATENTS

| | | | |
|---|---|---|---|
| 2,832,100 | 4/1958 | Swallert | 52—284 |
| 3,047,183 | 7/1962 | Papa | 220—4 |
| 3,234,318 | 2/1966 | Van Lieshout et al. | 174—50 |
| 3,250,421 | 5/1966 | Braun | 220—4 |
| 3,350,092 | 10/1967 | Maki | 94—3 S |
| 3,365,535 | 1/1968 | Wilk | 174—50 |
| 3,395,625 | 8/1968 | Blanchette et al. | 52—169 |
| 3,442,311 | 5/1969 | Rhyne | 52—284 |
| 3,451,452 | 6/1969 | Marshall et al. | 220—71 |
| 3,476,867 | 11/1969 | Mack | 174—37 |
| 1,276,312 | 8/1918 | Ballenberg | 287—20.92.6 |

FOREIGN PATENTS

| | | | |
|---|---|---|---|
| 514,487 | 1952 | Belgium | 287—20.92.6 |
| 668,936 | 1952 | Great Britain | 287—20.92.6 |
| 1,025,484 | 1966 | Great Britain | 287—20.92.6 |

FRANK L. ABBOTT, Primary Examiner

L. A. BRAUN, Assistant Examiner

U.S. Cl. X.R.

52—4, 19, 309; 174—37, 50; 220—4

UNITED STATES PATENT OFFICE
CERTIFICATE OF CORRECTION

Patent No. 3,618,275      Dated November 9, 1971

Inventor(s) Louis Ance

It is certified that error appears in the above-identified patent and that said Letters Patent are hereby corrected as shown below:

Column 5, line 31, change "housinig" to --housing--.

Column 6, lines 48 and 49 (Claim 3), change "protuberancse" to --protuberances--.

Column 7, line 18, change "esesntially" to --essentially--.

Column 7, line 57, change "junction" to --juncture--.

Column 7, line 69, change "as" to --at which--.

Signed and sealed this 3rd day of October 1972.

(SEAL)
Attest:

EDWARD M. FLETCHER, JR.
Attesting Officer

ROBERT GOTTSCHALK
Commissioner of Patents